United States Patent [19]

Hayward

[11] 4,009,293
[45] Feb. 22, 1977

[54] SUGAR CONTAINING FOODSTUFFS

[76] Inventor: Lionel Alan Walter Hayward, 40 Hyde Park Square, London, W.2., England

[22] Filed: Dec. 27, 1974

[21] Appl. No.: 537,013

[30] Foreign Application Priority Data

Jan. 7, 1974 United Kingdom ................ 580/74

[52] U.S. Cl. .............................. 426/659; 426/660
[51] Int. Cl.² ....................................... A23G 3/00
[58] Field of Search .......... 426/162, 214, 380, 566, 426/659, 660; 127/46, 48

[56] References Cited

UNITED STATES PATENTS

| 26,050 | 11/1859 | Paulsen | 127/46 R |
| 215,944 | 5/1879 | Liebert | 426/380 |
| 260,740 | 7/1882 | Brear | 127/46 R |
| 452,793 | 5/1891 | Kavanaugh | 426/214 |
| 2,176,033 | 10/1939 | Musher | 426/566 |

FOREIGN PATENTS OR APPLICATIONS 4,679 4/1886 United Kingdom ............... 426/214

Primary Examiner—Jeanette M. Hunter
Attorney, Agent, or Firm—Ladas, Parry, Von Gehr, Goldsmith & Deschamps

[57] ABSTRACT

Sugar containing foodstuffs having reduced cariogenic properties employing as the sugar component a syrup obtained by evaporating raw deproteinated cane or beet juice.

8 Claims, No Drawings

SUGAR CONTAINING FOODSTUFFS

FIELD OF THE INVENTION

The present invention relates to foodstuffs containing sugar, particularly sugar confectionery and to its production.

Traditionally sugar confectionery is made from refined beet or cane sugar.

In the production of refined sugars an aqueous extract of the sugar or raw juice (being the cane beet juice) is treated chemically, for example with flocculating agents or lime to precipitate minerals, (such as calcium, barium and magnesium phosphate and other salts) and protein. From the clarified liquid sucrose is crystalised to leave a syrupy mother liquor known as molasses.

In recent years there has been increasing concern as to the cariogenic properties of sugar confectionery particularly among infants and suggestions for reducing the tendency have included adding pure chemicals such as calcium phosphate calcium glycerophosphate and various fluorine-containing compounds, etc., to the confectionery at various stages in its manufacture.

SUMMARY OF THE INVENTION

It is an object of the present invention to provide a process for the production of foodstuffs having reduced cariogenic properties.

According to a first aspect of the present invention, there is provided a process for preparing sugar-containing foodstuffs which comprises evaporating raw cane sugar juice or aqueous beet sugar extract, optionally after the removal of protein but no other components, and subsequently incorporating the material so produced into foodstuffs in the known manner. From a further aspect, the present invention provides foodstuffs, particularly sugar confectionery, made by such a process.

DETAILED DESCRIPTION OF EMBODIMENTS OF THE INVENTION

The preferred starting material from which to produce foodstuffs according to the invention is cane juice.

The aqueous solution of sugar is normally evaporated with agitation. Conveniently, this can be accomplished in vacuum pans fitted with stirrers. A conventional deproteination step such as treatment with activated carbon may be employed if desired.

Some foaming may occur during the evaporation and if this occurs an antifoam of the type suitable for use in food or pharmaceutical applications such as dimethyl polysiloxane or polypropylene glycols may be employed.

It may also be desirable under some circumstances to add a small amount of alkaline material, for example sodium bicarbonate, to the liquid before or during the evaporation in order to reduce its acidity. If a proteinaceous material is present, for example as a result of no deproteination step having been carried out or only incomplete deproteination having been carried out, a preservative may be added.

The product obtained is typically in the form of a syrup - normally of at least 70% sugar content to avoid possible fermentation problems if the product is to be stored or transported. The syrup should not, however, be evaporated to such a degree that the viscosity is rasied to such a level that handling becomes difficult.

The unrefined sugar obtained by the process is employed in the manufacture of a wide variety of foodstuffs such as sugar confectionery in a similar manner to that employed for conventional refined sugar. It is particularly suited for use in opaque sugar confectionery articles such as toffees, fudge and caramels. It can also find use in the production of chocolate and indeed in the production of other foodstuffs in which sugar is employed in large quantities, such as ice cream, bakery goods sweet pickles and tinned or frozen foodstuffs.

The invention is illustrated by the following example, it is, however, to be understood that the spirit of the invention is not limited except insofar as it is defined in the appended claims.

EXAMPLE 100 parts by weight of cane juice are evaporated with agitation in a vacuum pan and dimethyl polysiloxane added to control foaming.

The evaporation is stopped when a syrup of 70% sugar content was obtained.

The sugar syrup obtained is then boiled at a temperature of 238° F with milk and butter in a weight ratio of 14:5.75:1. It is then cooled with constant beating to produce fudge.

Samples of caramel and toffee may also be made from the sugar syrup.

Thus caramel is obtained by boiling the sugar solution with activated water at 255° F and then adding milk and butter to the mixture in a weight ratio of sugar solution : milk : butter of 10:1:1 followed by boiling at 260°–275° F and then cooling with beating to produce caramel.

Toffee is produced by adding water in an amount of about 1:8 based on the weight of sugar solution and then boiling at 300° F in the presence of tartar. Butter (in an amount of approximately 10% based on the weight of the sugar solution) and citric acid are then removed from the heat and cooled with constant beating.

I claim:
1. A process for preparing sugar-containing foodstuffs which consists of partially de-proteinating and evaporating raw cane sugar juice or raw aqueous beet sugar extract under such conditions wherein no other components except protein present in the cane sugar juice or aqueous beet extract are removed from the solution to produce an unrefined sugar-containing syrup and incorporating the syrup so-produced directly into a foodstuff.

2. A process as claimed in claim 1 wherein an antifoam agent is added to the cane sugar juice or aqueous beet extract prior to or during the evaporation.

3. A process as claimed in claim 1 wherein the acidity of the cane sugar juice or aqueous beet sugar extract is controlled during the evaporation stage by the addition of sodium bicarbonate.

4. A process as claimed in claim 1 wherein the sugar juice or beet sugar extract is evaporated to produce a syrup containing at least 70% by weight of sugar.

5. A process as claimed in claim 1 wherein the evaporated cane sugar juice or aqueous beet sugar extract is incorporated into sugar confectionery.

6. A process as claimed in claim 5, wherein the sugar confectionery is toffee, caramel or fudge.

7. The foodstuff produced by the process of claim 1.

8. A foodstuff as claimed in claim 7 in the form of toffee, caramel or fudge.

* * * * *